United States Patent
Olson et al.

(10) Patent No.: US 12,202,599 B2
(45) Date of Patent: Jan. 21, 2025

(54) AUTONOMOUS EMERGENCY LUBRICATION OF AIRCRAFT GEARBOXES

(71) Applicant: Textron Innovations Inc., Providence, RI (US)

(72) Inventors: Eric Stephen Olson, Fort Worth, TX (US); Ezra Mike Tiprigan, North Richland Hills, TX (US)

(73) Assignee: Textron Innovations Inc., Providence, RI (US)

( * ) Notice: Subject to any disclaimer, the term of this patent is extended or adjusted under 35 U.S.C. 154(b) by 6 days.

(21) Appl. No.: 17/989,908

(22) Filed: Nov. 18, 2022

(65) Prior Publication Data

US 2024/0166345 A1 May 23, 2024

(51) Int. Cl.
*B64C 29/00* (2006.01)
*F16H 57/04* (2010.01)
*F16K 11/065* (2006.01)
*F16K 99/00* (2006.01)
*F16N 25/02* (2006.01)

(52) U.S. Cl.
CPC ..... *B64C 29/0033* (2013.01); *F16H 57/0442* (2013.01); *F16K 11/065* (2013.01); *F16N 25/02* (2013.01); *F16K 99/0028* (2013.01); *F16N 2260/20* (2013.01)

(58) Field of Classification Search
CPC ............. F16H 57/0442; F16H 57/0445; B64C 29/0033; F16N 2260/20; F16N 25/02; F16K 11/065; F16K 11/207; F16K 99/0028
See application file for complete search history.

(56) References Cited

U.S. PATENT DOCUMENTS

| | | | | |
|---|---|---|---|---|
| 4,852,612 | A * | 8/1989 | Bucko, Sr. ............ | F16K 11/044 137/625.5 |
| 5,878,773 | A * | 3/1999 | Robol ................... | F16K 11/105 137/513.5 |
| 7,677,997 | B2 * | 3/2010 | Hiramatsu .............. | F16H 55/56 474/18 |
| 10,190,672 | B2 * | 1/2019 | Ehinger ................. | B64D 35/00 |
| 10,443,706 | B2 | 10/2019 | Ehinger | |
| 10,816,085 | B2 | 10/2020 | Olson et al. | |
| 11,313,455 | B2 | 4/2022 | Mueller | |
| 2022/0034396 | A1 * | 2/2022 | Ogasawara ......... | F16H 57/0442 |

FOREIGN PATENT DOCUMENTS

JP          H0575416 U   * 10/1993

* cited by examiner

*Primary Examiner* — Minh Truong
(74) *Attorney, Agent, or Firm* — Lawrence Youst PLLC

(57) ABSTRACT

A drive system for an aircraft includes a first gearbox assembly and a second gearbox assembly that is in mechanical communication with the first gearbox assembly. A first pressurized lubrication system is configured to circulate a first lubricant through the first gearbox assembly. A second pressurized lubrication system is configured to circulate a second lubricant through the second gearbox assembly. An emergency lubrication system is configured to autonomously supply a portion of the first lubricant to the second gearbox assembly responsive to a loss of pressure in the second pressurized lubrication system. The emergency lubrication system is also configured to autonomously supply a portion of the second lubricant to the first gearbox assembly responsive to a loss of pressure in the first pressurized lubrication system.

18 Claims, 10 Drawing Sheets

AUTONOMOUS EMERGENCY LUBRICATION OF AIRCRAFT GEARBOXES

GOVERNMENT RIGHTS

This invention was made with U.S. Government support under Agreement No. W9124P-19-9-0001 awarded by the Army Contracting Command-Redstone Arsenal to the AMTC and a related AMTC Project Agreement 19-08-006 with Bell Textron Inc. The Government has certain rights in the invention.

TECHNICAL FIELD OF THE DISCLOSURE

The present disclosure relates, in general, to lubrication systems for aircraft gearboxes and, in particular, to emergency lubrication systems configured to autonomously provide persistent lubrication to an aircraft gearbox experiencing a loss of lubrication.

BACKGROUND

Aircraft include many components and systems that are powered by one or more engines. For example, engines in a rotorcraft such as a helicopter or tiltrotor aircraft provide power to one or more propulsion systems, such as rotor systems or proprotor systems, through one or more drive systems. The drive systems may include components such as gearboxes, masts, driveshafts, bearings and gears which transfer torque and rotational energy from the engine to the propulsion system. Typically, the gearboxes that are located between an engine and a propulsion system of a rotorcraft require lubrication that is provided by a lubrication system, the proper functioning of which is critical to the safety and service life of the aircraft.

When functioning properly, an aircraft gearbox lubrication system reduces the likelihood that the drive system will lose torque, fail or overheat. In one example, a pressurized aircraft gearbox lubrication system may operate properly when the pressure is maintained above a threshold pressure but may not operate properly when the pressure drops below the threshold pressure. In some aircraft gearboxes, a failure at any point in the lubrication system such as a gear, a shaft, a pump, a pressurized tube or a sump can cause complete failure of the lubrication system resulting in the entire gearbox losing lubrication. If the design of gears in the gearbox relies on the lubrication system to maintain proper operating temperature, then such a loss of lubrication could result in a catastrophic failure of the gears in the gearbox and could hinder the ability of an aircraft to remain in flight. Accordingly, some aviation regulations require that a pressurized lubrication system of an aircraft remain operable for a specified amount of time after the occurrence of such a loss of lubrication event.

SUMMARY

In a first aspect, the present disclosure is directed to a drive system for an aircraft. The drive system includes a first gearbox assembly and a second gearbox assembly that is in mechanical communication with the first gearbox assembly. A first pressurized lubrication system is configured to circulate a first lubricant through the first gearbox assembly. A second pressurized lubrication system is configured to circulate a second lubricant through the second gearbox assembly. An emergency lubrication system is configured to autonomously supply a portion of the first lubricant to the second gearbox assembly responsive to a loss of pressure in the second pressurized lubrication system.

In some embodiments, the first gearbox assembly may include one of a proprotor gearbox and an interconnect gearbox and the second gearbox assembly may include the other of the proprotor gearbox and the interconnect gearbox. In certain embodiments, the first pressurized lubrication system may include a tank, a pump, a heat exchanger, a filter and at least one lubrication line. In some embodiments, the second pressurized lubrication system may include a tank, a pump, a heat exchanger, a filter and at least one lubrication line. In certain embodiments, the first pressurized lubrication system may be independent of the second pressurized lubrication system during normal operating conditions. In some embodiments, the emergency lubrication system may include a valve assembly positioned between the first pressurized lubrication system and the second pressurized lubrication system. In such embodiments, pressure in the second pressurized lubrication system may maintain the valve assembly in a closed position during normal operating conditions of the second pressurized lubrication system and, responsive to the loss of pressure in the second pressurized lubrication system, the valve assembly may shift to an open position such that the portion of the first lubricant is autonomously supplied to the second gearbox assembly. Alternatively, in such embodiments, the valve assembly may be maintained in an operating configuration to supply a portion of the second lubricant to the second gearbox assembly during normal operating conditions of the second pressurized lubrication system and, responsive to the loss of pressure in the second pressurized lubrication system, the valve assembly may shift to an emergency position such that the portion of the first lubricant is autonomously supplied to the second gearbox assembly.

In certain embodiments, the valve assembly may be a spring biased differential pressure operated valve assembly. In some embodiments, the emergency lubrication system may be configured to autonomously supply the portion of the first lubricant to the second gearbox assembly responsive to the loss of pressure in the second pressurized lubrication system for a predetermined period of time. In certain embodiments, loss of pressure in the second pressurized lubrication system may be the pressure in the second pressurized lubrication system falling below a predetermined threshold pressure. In some embodiments, a sensor may be configured to detect when the portion of the first lubricant is autonomously supplied to the second gearbox assembly.

In certain embodiments, the emergency lubrication system may be configured to autonomously supply a portion of the second lubricant to the first gearbox assembly responsive to a loss of pressure in the first pressurized lubrication system. In some embodiments, the emergency lubrication system may include a valve assembly positioned between the first pressurized lubrication system and the second pressurized lubrication system. In such embodiments, pressure in the first pressurized lubrication system may maintain the valve assembly in a closed position during normal operating conditions of the first pressurized lubrication system and, responsive to the loss of pressure in the first pressurized lubrication system, the valve assembly may shift to an open position such that the portion of the second lubricant is autonomously supplied to the first gearbox assembly. Alternatively, in such embodiments, the valve assembly may be maintained in an operating configuration to supply a portion of the first lubricant to the first gearbox assembly during normal operating conditions of the first pressurized lubrication system and, responsive to the loss of pressure in the first pressurized lubrication system, the valve assembly may shift to an emergency position such that the portion of the second lubricant is autonomously supplied to the first gearbox assembly.

In certain embodiments, the valve assembly may be a spring biased differential pressure operated valve assembly. In some embodiments, the emergency lubrication system may be configured to autonomously supply the portion of the second lubricant to the first gearbox assembly responsive to the loss of pressure in the first pressurized lubrication system for a predetermined period of time. In certain embodiments, the loss of pressure in the first pressurized lubrication system may be the pressure in the first pressurized lubrication system falling below a predetermined threshold pressure.

In a second aspect, the present disclosure is directed to a tiltrotor aircraft having a helicopter mode and an airplane mode. The tiltrotor aircraft includes a proprotor assembly, a first gearbox assembly in mechanical communication with the proprotor assembly, a second gearbox assembly in mechanical communication with the first gearbox assembly and an engine in mechanical communication with the second gearbox assembly and configured to provide torque and rotational energy to the proprotor assembly via the first and second gearbox assemblies. A first pressurized lubrication system is configured to circulate a first lubricant through the first gearbox assembly. A second pressurized lubrication system is configured to circulate a second lubricant through the second gearbox assembly. An emergency lubrication system is configured to autonomously supply a portion of the first lubricant to the second gearbox assembly responsive to a loss of pressure in the second pressurized lubrication system and is configured to autonomously supply a portion of the second lubricant to the first gearbox assembly responsive to a loss of pressure in the first pressurized lubrication system.

In a third aspect, the present disclosure is directed to an aircraft that includes a rotor assembly, a first gearbox assembly in mechanical communication with the rotor assembly, a second gearbox assembly in mechanical communication with the first gearbox assembly and an engine in mechanical communication with the second gearbox assembly and configured to provide torque and rotational energy to the rotor assembly via the first and second gearbox assemblies. A first pressurized lubrication system is configured to circulate a first lubricant through the first gearbox assembly. A second pressurized lubrication system is configured to circulate a second lubricant through the second gearbox assembly. An emergency lubrication system is configured to autonomously supply a portion of the first lubricant to the second gearbox assembly responsive to a loss of pressure in the second pressurized lubrication system and is configured to autonomously supply a portion of the second lubricant to the first gearbox assembly responsive to a loss of pressure in the first pressurized lubrication system.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1B:
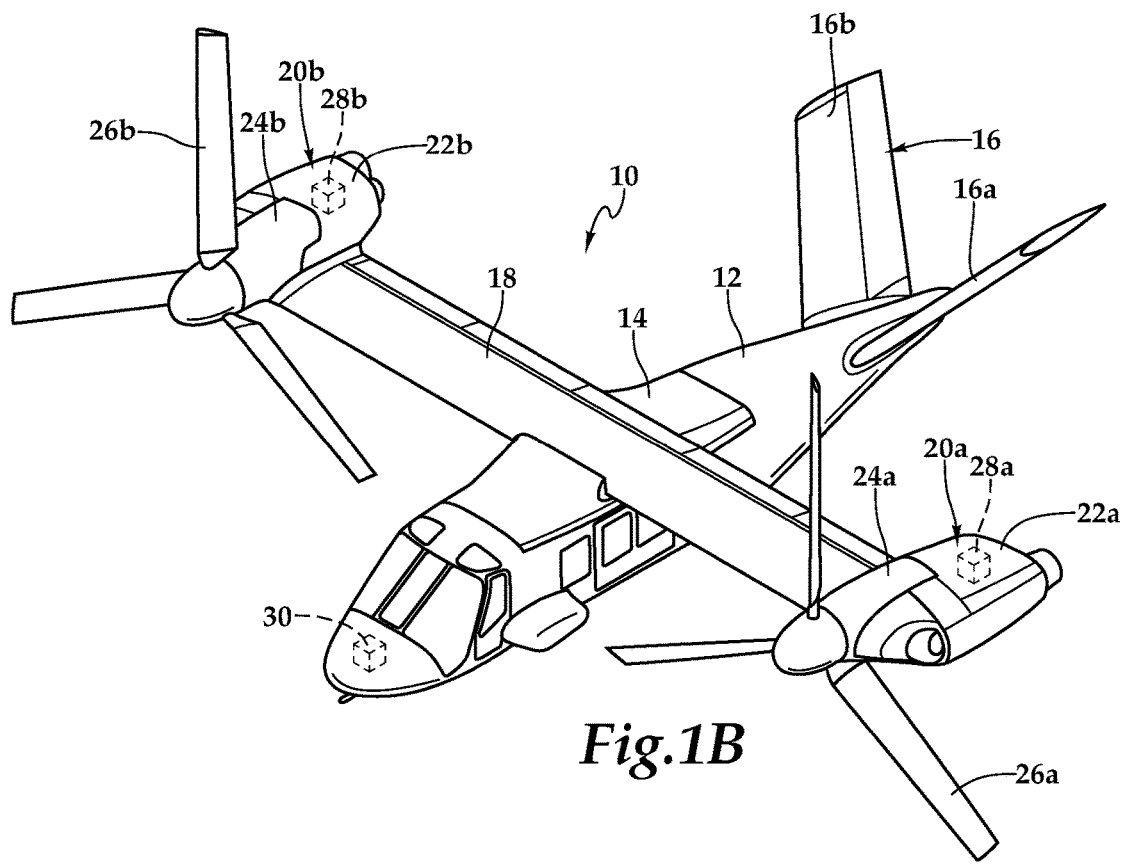
FIGS. 1A-1B are schematic illustrations of a tiltrotor aircraft including autonomous emergency lubrication systems in accordance with embodiments of the present disclosure.
Figure 1A:
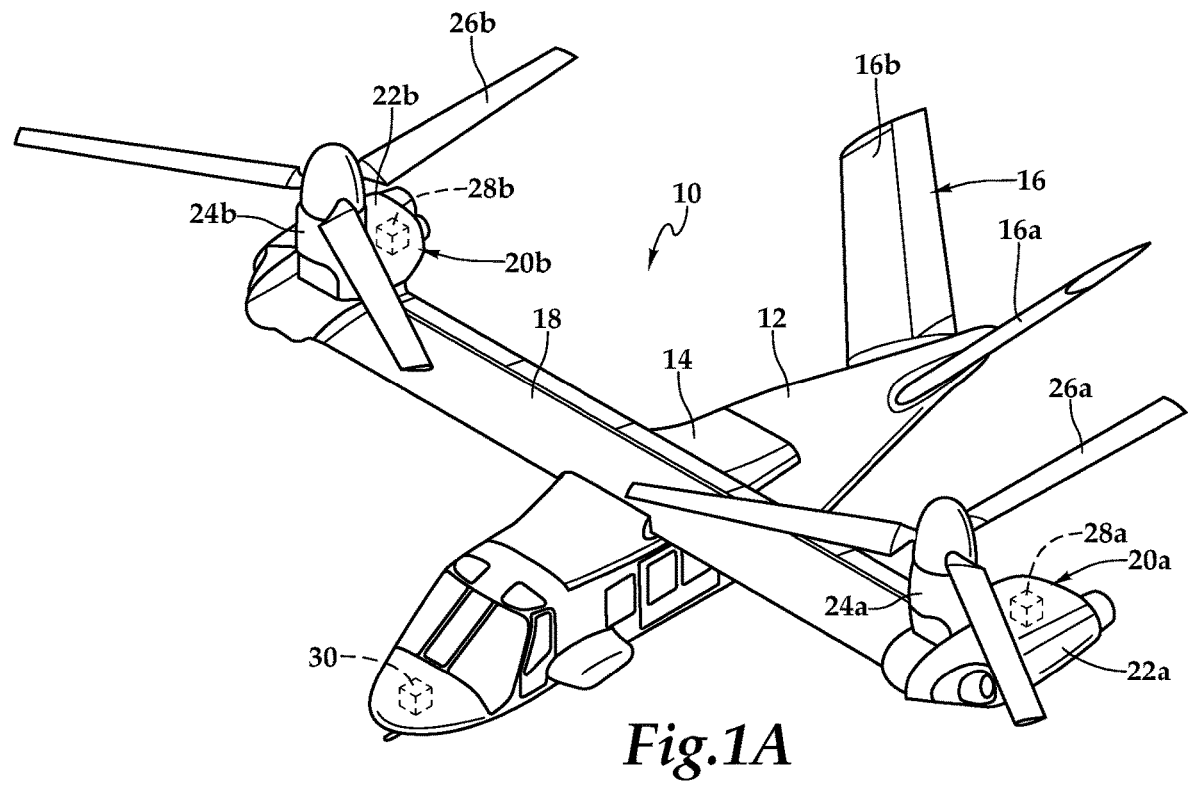

Referring to FIGS. 1A-1B in the drawings, an aircraft depicted as a rotorcraft and more particularly as a tiltrotor aircraft is schematically illustrated and generally designated 10. Aircraft 10 includes a fuselage 12, a wing mount assembly 14 that is rotatable relative to fuselage 12 and a tail assembly 16 including rotatably mounted tail members 16a, 16b having control surfaces operable for horizontal and/or vertical stabilization during forward flight. A wing 18 is supported by wing mount assembly 14 and rotates with wing mount assembly 14 relative to fuselage 12 to enable tiltrotor aircraft 10 to convert to a storage configuration. Together, fuselage 12, tail assembly 16 and wing 18 as well as their various frames, longerons, stringers, bulkheads, spars, ribs, skins and the like form the airframe of tiltrotor aircraft 10.

Located proximate the outboard ends of wing 18 are propulsion assemblies 20a, 20b. Propulsion assembly 20a includes a fixed nacelle 22a that houses an engine and a fixed portion of a drive system. In addition, propulsion assembly 20a includes a pylon assembly 24a that is positioned inboard of fixed nacelle 22a and above wing 18. Pylon assembly 24a is rotatable relative to fixed nacelle 22a and wing 18 between a generally vertical orientation, as best seen in FIG. 1A, a generally horizontal orientation, as best seen in FIG. 1B. Pylon assembly 24a includes a rotatable portion of the drive system and a rotor assembly depicted as proprotor assembly 26a that is rotatable responsive to torque and rotational energy provided via the engine and drive system. Propulsion assembly 20a includes a lubrication system 28a that provides lubrication including autonomous emergency lubrication for multiple gearbox assemblies within the drive system of propulsion assembly 20a. Likewise, propulsion assembly 20b includes a fixed nacelle 22b that houses an engine and a fixed portion of a drive system. In addition, propulsion assembly 20b includes a pylon assembly 24b that is positioned inboard of fixed nacelle 22b and above wing 18. Pylon assembly 24b is rotatable relative to fixed nacelle 22b and wing 18 between a generally vertical orientation, as best seen in FIG. 1A, a generally horizontal orientation, as best seen in FIG. 1B. Pylon assembly 24b includes a rotatable portion of the drive system and a rotor assembly depicted as proprotor assembly 26b that is rotatable responsive to torque and rotational energy provided via the engine and drive system. Propulsion assembly 20b includes a lubrication system 28b that provides lubrication including autonomous emergency lubrication for multiple gearbox assemblies within the drive system of propulsion assembly 20b.

FIG. 1A illustrates aircraft 10 in helicopter or VTOL flight mode, in which proprotor assemblies 26a, 26b are rotating in a substantially horizontal plane to provide a lifting thrust, such that aircraft 10 flies much like a conventional helicopter. FIG. 1B illustrates aircraft 10 in airplane or forward flight mode, in which proprotor assemblies 26a, 26b are rotating in a substantially vertical plane to provide a forward thrust enabling wing 18 to provide a lifting force responsive to forward airspeed, such that aircraft 10 flies much like a conventional propeller driven aircraft. It should be appreciated that aircraft 10 can be operated such that proprotor assemblies 26a, 26b are selectively positioned between airplane mode and helicopter mode, which can be referred to as a conversion flight mode. Even though aircraft 10 has been described as having one engine in each fixed nacelle 22a, 22b, it should be understood by those having ordinary skill in the art that other propulsion system arrangements are possible and are considered to be within the scope of the present disclosure including, for example, having one or more engines housed within the fuselage that provide torque and rotational energy to both proprotor assemblies 26a, 26b.

During all flight modes, proprotor assemblies 26a, 26b rotate in opposite directions to provide torque balancing to aircraft 10. For example, when viewed from the front of aircraft 10 in forward flight mode, proprotor assembly 26a rotates clockwise and proprotor assembly 26b rotates counterclockwise. In the illustrated embodiment, proprotor assemblies 26a, 26b each include three twisted proprotor blades that are equally spaced apart circumferentially at approximately 120 degree intervals. It should be understood by those having ordinary skill in the art, however, that the proprotor assemblies of the present disclosure could have proprotor blades with other designs and other configurations including proprotor assemblies having four, five or more proprotor blades. Further, it should be understood by those having ordinary skill in the art that aircraft 10 is merely illustrative of a variety of aircraft that can be used to implement embodiments of the present disclosure. Other aircraft implementations can include, for example, fixed wing airplanes, hybrid aircraft, unmanned aircraft, gyrocopters, helicopters and drones to name a few. Moreover, it should be appreciated that even though aircraft are particularly well suited to implement embodiments of the present disclosure, the described embodiments can also be implemented using non-aircraft vehicles and devices.

Aircraft 10 has a fly-by-wire control system that includes a flight control computer 30 that is preferably a redundant digital flight control system including multiple independent flight control computers. Flight control computer 30 preferably includes non-transitory computer readable storage media including a set of computer instructions executable by one or more processors for controlling the operation of aircraft 10. Flight control computer 30 may be implemented on one or more general-purpose computers, special purpose computers or other machines with memory and processing capability. Flight control computer 30 may include one or more memory storage modules including random access memory, non-volatile memory, removable memory or other suitable memory. Flight control computer 30 may be a microprocessor-based system operable to execute program code in the form of machine-executable instructions. Flight control computer 30 may be connected to other computer systems via a suitable communications network that may include both wired and wireless connections.

Flight control computer 30 communicates via a wired communications network within airframe 12 with the electronic systems and subsystems of aircraft 10 including sensors, controllers, actuators, pumps, valves, regulators, switches, user interfaces and other electronic systems used during flight and non-flight operations. Flight control computer 30 may autonomously control some or all aspects of flight operation for aircraft 10. Flight control computer 30 is also operable to communicate with remote systems, such as a ground station via a wireless communications protocol. The remote system may be operable to receive flight data from and provide commands to flight control computer 30 to enable remote flight control over some or all aspects of flight operation for aircraft 10. In addition, aircraft 10 may be pilot operated such that a pilot interacts with a pilot interface that receives flight data from and provides commands to flight control computer 30 to enable onboard pilot control over some or all aspects of flight operation for aircraft 10.

Figure 2A:
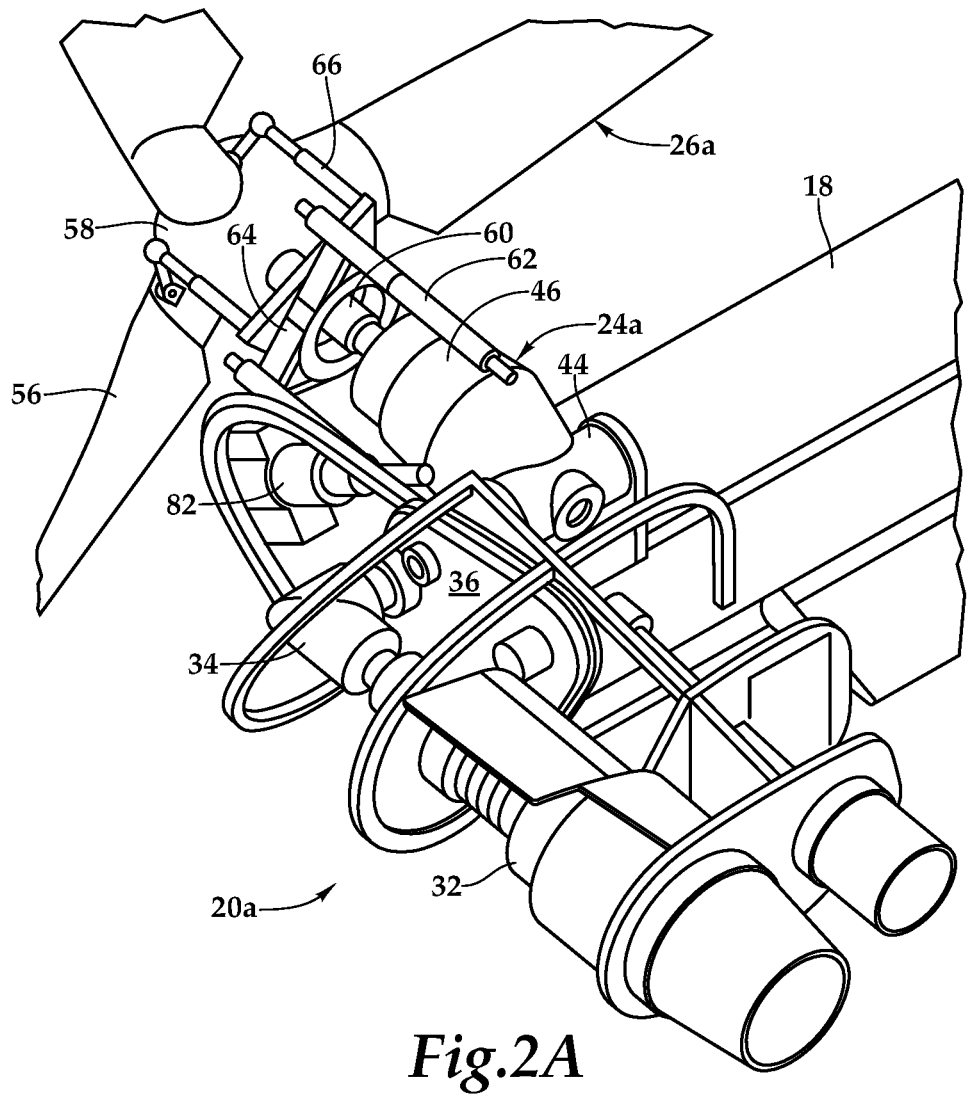
FIGS. 2A-2B are perspective views of a propulsion system and components parts thereof for a tiltrotor aircraft including autonomous emergency lubrication systems in accordance with embodiments of the present disclosure.
Figure 2B:
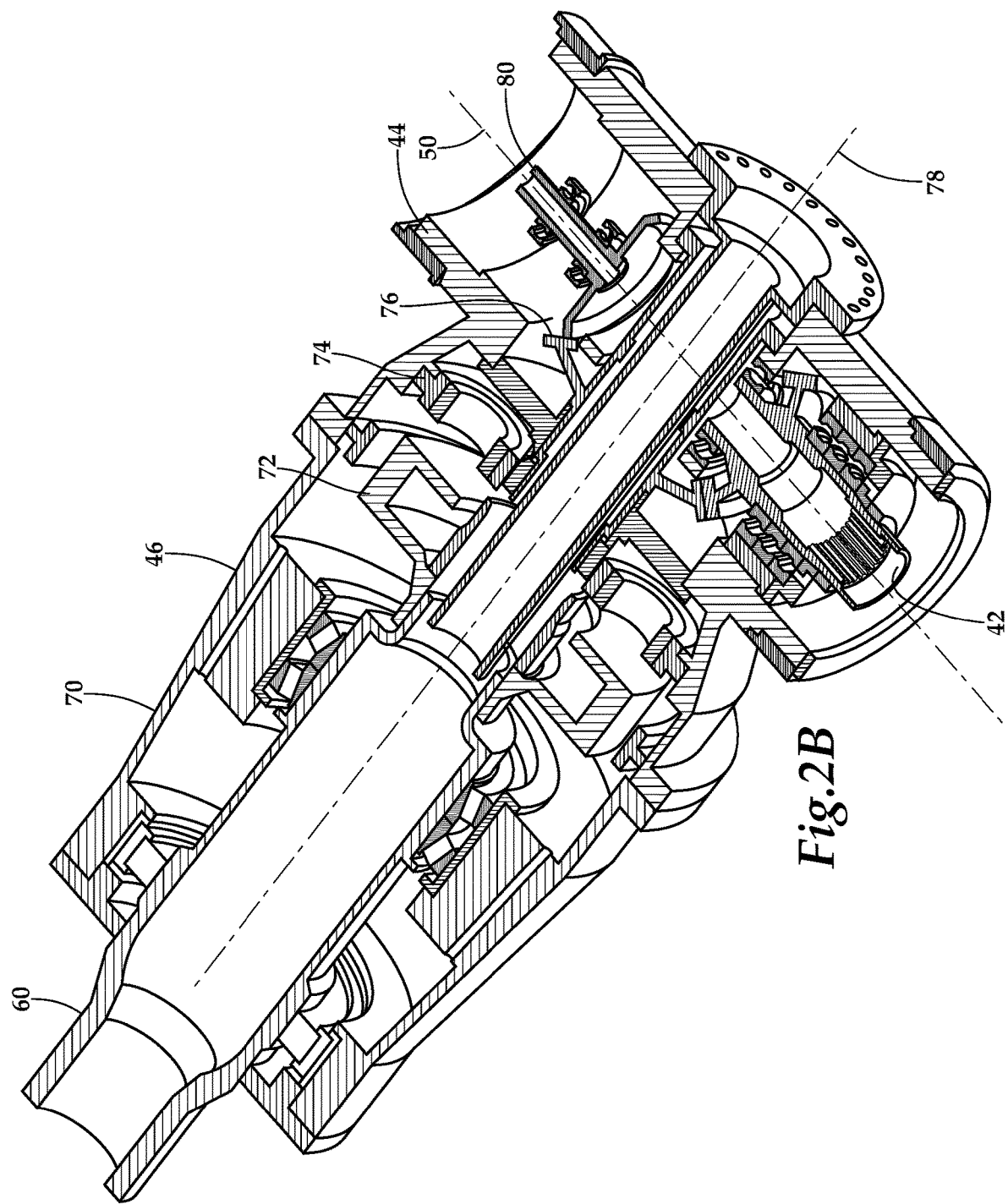

Referring to FIGS. 2A-2B in the drawings, additional details of propulsion assembly 20a will now be disclosed. Propulsion assembly 20a is substantially similar to propulsion assembly 20b therefore, for sake of efficiency, certain features will be disclosed only with regard to propulsion assembly 20a. One having ordinary skill in the art, however, will fully appreciate an understanding of propulsion assembly 20b based upon the disclosure herein of propulsion assembly 20a. Propulsion system 20a includes an engine 32 that is fixed relative to wing 18. An engine output shaft transfers power from engine 32 to a spiral bevel gearbox 34 that includes spiral bevel gears to change torque direction by 90 degrees from engine 32 to an interconnect gearbox 36. Interconnect gearbox 36 includes a plurality of gears, such as helical gears, in a gear train that are coupled to an interconnect drive shaft 38 (see FIG. 3) and an output shaft (not visible). Interconnect drive shaft 38 provides a torque path that enables a single engine to provide torque to both proprotors assemblies 26a, 26b in the event of a failure of the other engine. Torque is transferred to an input gear 42 in a spindle gearbox 44 through the output shaft of interconnect gearbox 36.

As best seen in FIG. 2A, proprotor assembly 26a of propulsion system 20a includes a plurality of proprotor blades 56 coupled to a yoke 58 that is coupled to a mast 60. Mast 60 is coupled to proprotor gearbox 46. The collective and/or cyclic pitch of proprotor blades 56 may be controlled responsive to pilot input via actuators 62, swashplate 64 and pitch links 66. As best seen in FIG. 2B, proprotor gearbox 46 is configured to transfer power and reduce engine rotational speed to mast 60. Proprotor gearbox 46 includes a top case portion 70. Speed reduction is accomplished by a low speed planetary gear assembly 72 and a high speed planetary gear assembly 74. Spindle gearbox 44 includes a spiral bevel gear assembly having a spiral bevel input gear 42 and a spiral bevel output gear 76. The spiral bevel gear assembly changes power direction from along longitudinal axis 50 of spiral bevel input gear 42 to a centerline axis 78 of spiral bevel output gear 76. An accessory drive 80 can be coupled to spiral bevel output gear 76. It should be appreciated that a gearbox assembly such as spindle gearbox 44 and proprotor gearbox 46 can include additional or different components including bearing systems, lubrication systems and other gearbox related systems that may be beneficial for operation. During operation, a conversion actuator 82 can be actuated to selectively rotate proprotor gearbox 46 and thus pylon assembly 24a about conversion axis 50, which in turn selectively positions proprotor assembly 26a between helicopter mode, as best seen in FIG. 1A, and airplane mode, as best seen in FIG. 1B.

Figure 3:
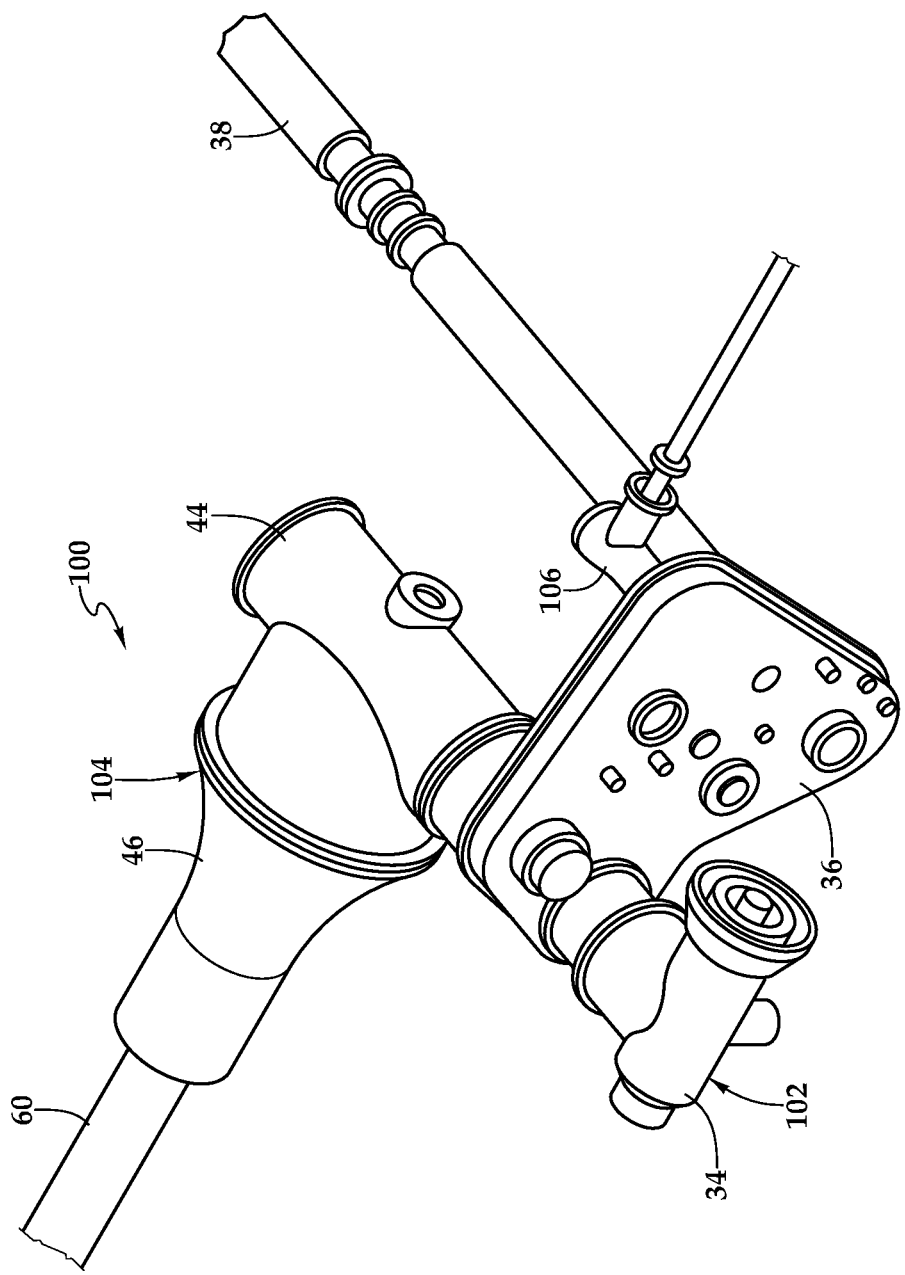
FIG. 3 is a perspective view of a drive system of a tiltrotor aircraft including autonomous emergency lubrication systems in accordance with embodiments of the present disclosure.

Referring additionally to FIG. 3 of the drawings, a drive system 100 is depicted, which is representative of the fixed portion of the drive system together with the rotatable portion of the drive system of propulsion assemblies 20a, 20b. As illustrated, drive system 100 include a fixed gearbox assembly 102 and a rotatable gearbox assembly 104. Fixed gearbox assembly 102 includes spiral bevel gearbox 34, interconnect gearbox 36, blower gearbox 106 and interconnect driveshaft 38. Rotatable gearbox assembly 104 includes spindle gearbox 44, proprotor gearbox 46 and mast 60. Engine 32 is coupled to and is in mechanical communication with fixed gearbox assembly 102 which is coupled to and is in mechanical communication with rotatable gearbox assembly 104 which is coupled to and is in mechanical communication with proprotor assembly 26a such that engine 32 provides torque and rotational energy to proprotor assembly 26a via fixed gearbox assembly 102 and rotatable gearbox assembly 104. More specially, engine 32 is fixed relative to wing 18 of aircraft 10 and provides torque via an engine output shaft to spiral bevel gearbox 34. Spiral bevel gearbox 34 changes torque direction by approximately 90 degrees from engine 32 to interconnect gearbox 36. Interconnect gearbox 36 includes gears in a gear train that are coupled to interconnect driveshaft 38, blower gearbox 106 and spindle gearbox 44. Interconnect gearbox 36 may be configured to provide power to various system accessories such as alternators, lube and scavenge pumps, hydraulic pumps, generators and other mechanically driven systems. The blower gearbox 106 may be configured to provide torque to an oil cooler blower fan, which may be used to draw in air for lubricant temperature reduction. Spindle gearbox 44 changes torque direction by approximately 90 degrees from interconnect gearbox 36 to proprotor gearbox 46. Proprotor gearbox 46 is configured to transfer power and reduce engine rotational speed to mast 60.

Gears, bearings and other mechanical components of drive system 100 are subject to wear and heat generation due to contact with other components. These mechanical components may be lubricated to reduce friction and transfer heat away from the components. Lubrication is the process or technique employed to reduce wear of one or both surfaces in close proximity, and moving relative to each other, by interposing a substance, such as a lubricant, between the surfaces to help carry the load between the opposing surfaces. Examples of lubricants can include oil, biolubricants derived from plants and animals, synthetic oils, solid lubricants and aqueous lubricants. Drive system 100 includes multiple lubrication systems to provide lubricant to the mechanical components therein.

Figure 4:
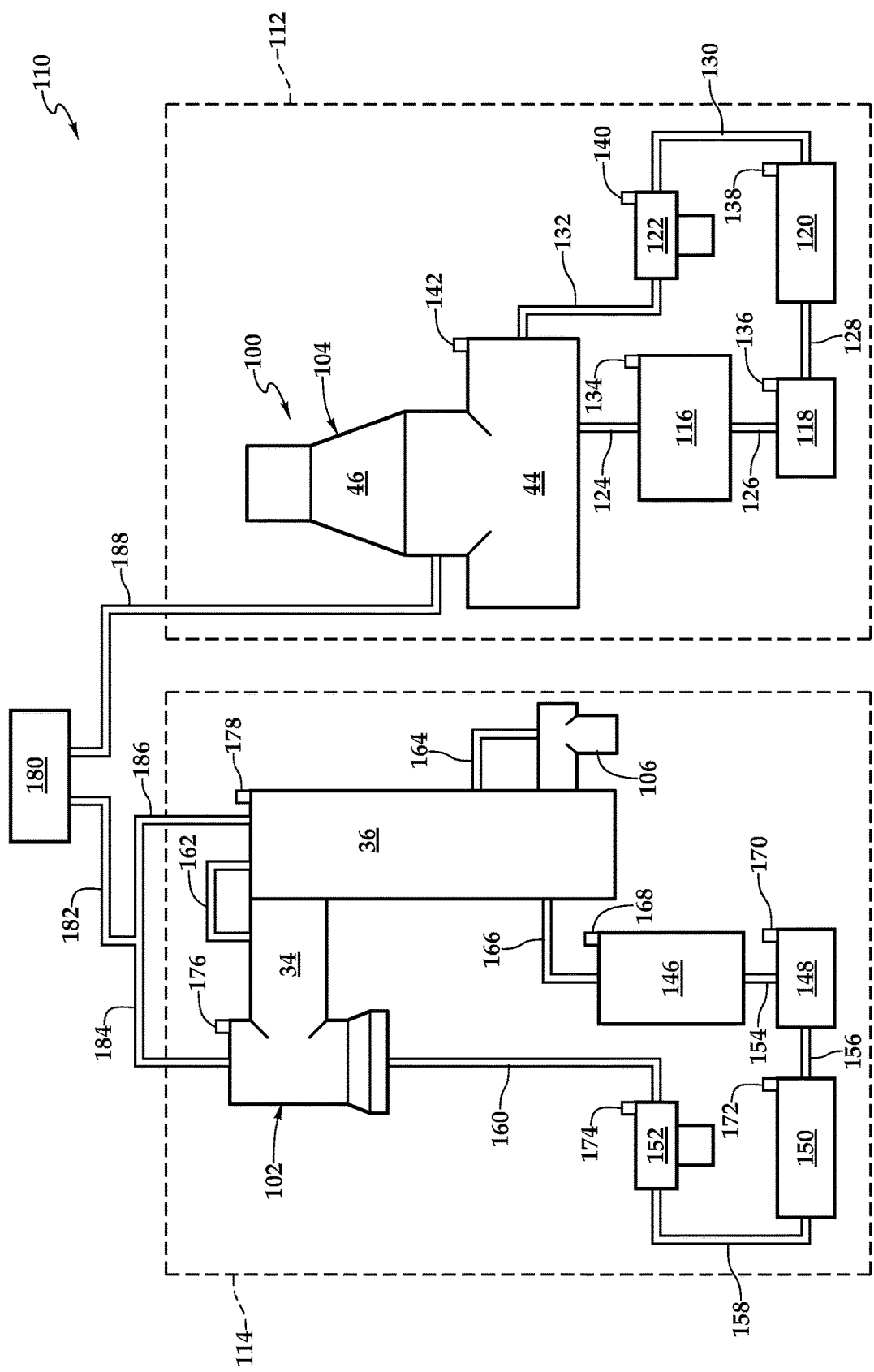
FIG. 4 is a schematic illustration of a lubrication arrangement for a drive system of a tiltrotor aircraft including an emergency lubrication system in accordance with embodiments of the present disclosure.

Referring to FIG. 4 of the drawings, a schematic illustration of a lubrication arrangement 110 for use with drive system 100 is depicted. In the illustrated embodiment, lubrication arrangement 110 includes a first pressurized lubrication system 112 and a second pressurized lubrication system 114. Lubrication system 112 provides lubricant to components of rotatable gearbox assembly 104 and lubrication system 114 provides lubricant to components of fixed gearbox assembly 102. Lubrication system 112 includes a lubricant tank 116, a pump 118, a heat exchanger 120, a filter 122, lubrication lines 124, 126, 128, 130, 132 and sensors 134, 136, 138, 140, 142. Lubrication system 114 includes a lubricant tank 146, a pump 148, a heat exchanger 150, a filter 152, lubrication lines 154, 156, 158, 160, 162, 164, 166 and sensors 168, 170, 172, 174, 176, 178. Lubrication systems 112, 114 may also include other components such as pressure regulators, flowmeters, check valves and jets, which are not depicted.

Tanks 116, 146 represent reservoirs that store lubricant within lubrication systems 112, 114, respectively. Tanks 116, 146 may be integral with the housing of one of the gearboxes, such as interconnect gearbox 36 or proprotor gearbox 46, or separate from the housings of the gearboxes. Pumps 118, 148 represent devices that can be configured to circulate pressurized lubricant throughout lubrication systems 112, 114, respectively. Heat exchangers 120, 150 represent devices configured to lower the temperature of the lubricant before the lubricant is applied to the various components that generate heat. Filters 122, 152 represent devices configured to remove contaminants from the lubricant. Sensors 134-142 and 168-178 represent devices that are configured to detect a variety of aircraft parameters and to provide this sensor data to flight control computer 30 such that flight control computer 30 may instruct aircraft systems to respond as appropriate to the detected aircraft parameters. For example, lubrication arrangement 110 may include pressure sensors, temperature sensors, flow rate sensors, volume sensors or other suitable sensors for detecting one or more parameters of the lubricants within lubrication systems 112, 114. Examples of sensors may include strain-gauge sensors, capacitive sensors, electromagnetic sensors, piezoelectric sensors, optical sensors, potentiometric sensors, resonant sensors and thermal sensors, to name a few. The sensor data is preferably communicated to flight control computer 30 to be evaluated such that flight control computer 30 may make a determination regarding the status of systems within lubrication arrangement 110 and command any corrective action as required. Jets, which are not shown in the schematic view of FIG. 4, may be devices configured to dispense lubricant on components of drive system 100 that are subject to friction and/or generate heat, such as gears and bearing.

Lubrication lines 124-132 and 154-166 may represent fluid lines that connect various components of lubrication systems 112, 114. Lubrication lines 124-132 and 154-166 may represent rigid pipelines, such as core passages in the housing of a gearbox, or flexible hoses, such as fluoropolymer tubing. The type of lubrication lines used may depend on the location of the line or expected fluid pressure within the line. Lubrication lines 124-132 and 154-166 may include other components such as swivels and quick disconnect couplings. In some examples, lubrication lines 124-132 and 154-166 may be collapsible in order to reduce residual lubricant during storage and when lubricant is not being flowed through the line.

In the illustrated embodiment of lubrication system 112, tank 116 contains a first lubricant that is received by pump 118 through lubrication line 126. Pump 118 then delivers the lubricant into lubrication line 128 to heat exchanger 120 where the lubricant is cooled. Next, the lubricant travels from heat exchanger 120, through line 130, to filter 122 where particles may be removed from the lubricant. From filter 122, the lubricant travels through line 132 to rotatable gearbox assembly 104, such that the lubricant gets delivered to various moving components therein via lubricant jets. The lubricant then travels through line 124 back to tank 116. In the illustrated embodiment of lubrication system 114, tank 146 contains a second lubricant that is received by pump 148 through lubrication line 154. Pump 148 then delivers the lubricant into lubrication line 156 to heat exchanger 150 where the lubricant is cooled. Next, the lubricant travels from heat exchanger 150, through line 158, to filter 152 where particles may be removed from the lubricant. From filter 152, the lubricant travels through line 160 to fixed gearbox assembly 102, such that the lubricant gets delivered to the various moving components therein via lubricant jets. As illustrated, within fixed gearbox assembly 102, the lubricant may travel through lubrication lines 162, 164. The lubricant then travels through line 166 back to tank 146.

Under normal operating conditions, lubrication systems 112, 114 provide proper lubrication to the moving components of rotatable gearbox assembly 104 and fixed gearbox assembly 102, respectively. In one example, the lubricant pressure within the gearboxes of rotatable gearbox assembly 104 and fixed gearbox assembly 102 may be at a normal level of between 50-80 psi (pounds per square inch). Additionally, during normal operating conditions, the first lubricant in first lubrication system 112 is not in fluid communication with the second lubricant in second lubrication system 114. Accordingly, lubrication systems 112, 114 are independent of one another during normal operating conditions.

If proper lubrication is not provided to the moving components within the gearbox assemblies due to a loss of lubrication event occurring within one of the lubrication systems, the moving components of the affected gearbox assembly may experience excessive wear or the failure of components. One example cause of a loss of lubrication may be a leak between the casing of one of the gearboxes and one of its components. In some loss of lubrication circumstances, the lubricant pressure within a gearbox may be reduced to an undesired level such as below 30 psi, and in some instances may even drop to zero psi.

It is noted that certain aircraft are required to maintain manageable flight operations for selected durations of time if the aircraft experiences low lubricant pressure, such as during a loss of lubrication situation or lubrication system failure. For example, an aviation agency may require that the loss of lubrication will not prevent continued safe operation for at least 30 minutes after perception by the flight crew of the lubrication system failure or loss of lubrication. Therefore, some aircraft may also include a secondary lubrication system, such as emergency lubrication system 180 that may represent a system that has a secondary lubricant tank and a pressurizing device. For example, the lubricant tank of emergency lubrication system 180 may represent a reservoir configured to contain lubricant such as a lubricant tank configured to contain approximately seven gallons of lubricant. Examples of a pressurizing device that can be used in emergency lubrication system 180 may be a mechanically driven pump, a hydraulically driven pump, an electrically driven pump, or a gravity feed system.

In a loss of lubrication event, lubricant may be introduced from the emergency lubrication system 180 to the working components of gearbox assemblies 102, 104 via emergency jets which may be dedicated emergency jets or may be a portion of the lubricant jets used for delivering lubricant during normal operating conditions. Lubricant may be provided from the secondary lubrication tank of emergency lubrication system 180 to gearbox assembly 102 through lubrication lines 182, 184, 186 and the emergency jets (not shown), and/or to gearbox assembly 104 through lubrication line 188 and the emergency jets (not shown). Even though the use of emergency lubrication system 180 has some advantages, such as increasing the amount of time the aircraft is operable, this method may have some potential disadvantages, such as increasing the weight of the aircraft due to the extra tank with emergency lubricant, the extra pump, the extra valves and/or the added lubricant heating system that may be included in an emergency lubrication system. Therefore, a new system and method for providing emergency lubrication is needed.

Figure 5:
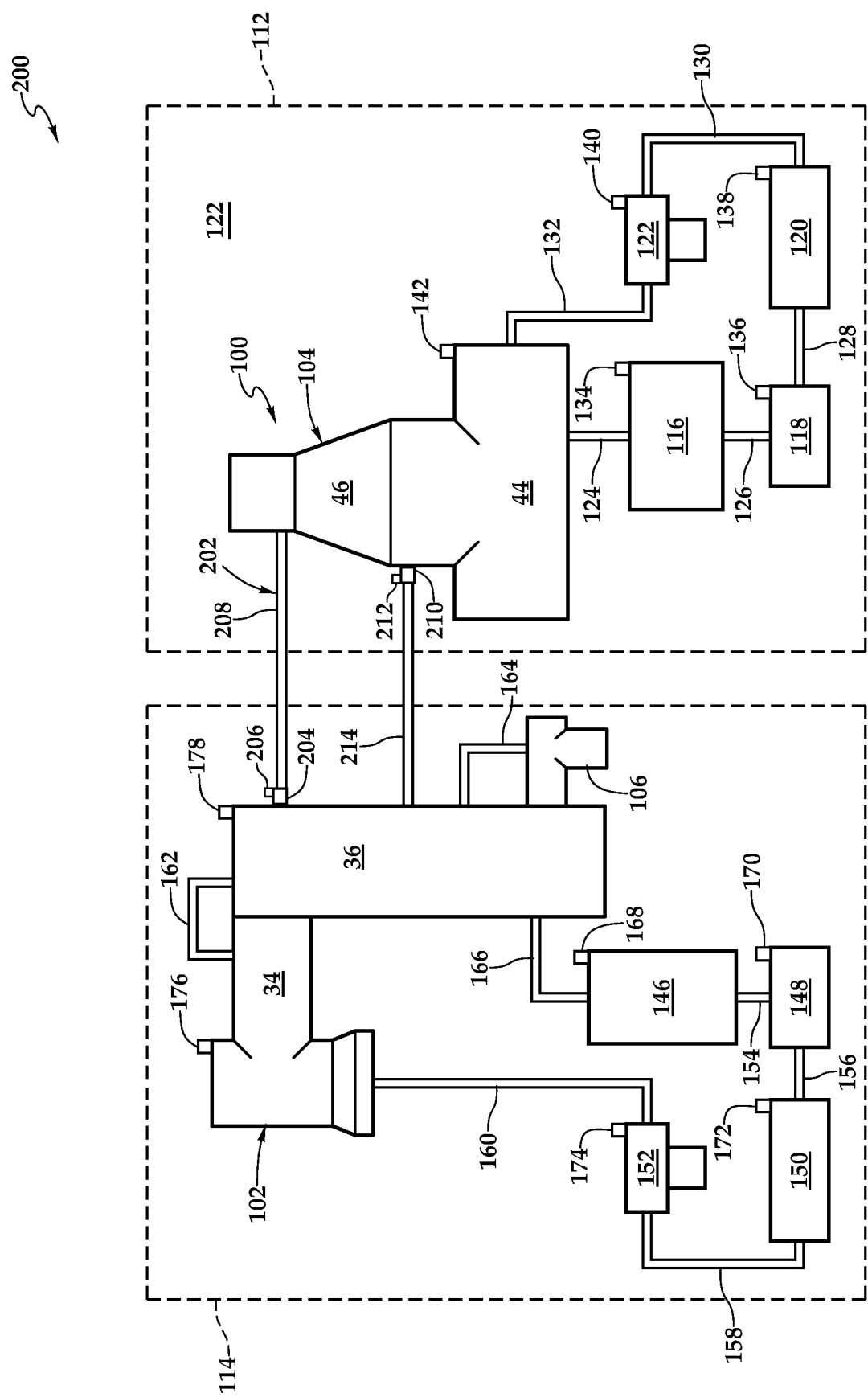
FIG. 5 is a schematic illustration of a lubrication arrangement for a drive system of a tiltrotor aircraft including an autonomous emergency lubrication system in accordance with embodiments of the present disclosure.

Referring to FIG. 5 of the drawings, a schematic illustration of a lubrication arrangement 200 for drive system 100 is depicted. As with lubrication arrangement 110, lubrication arrangement 200 includes first pressurized lubrication system 112 and second pressurized lubrication system 114. Lubrication system 112 provides lubricant to components of rotatable gearbox assembly 104 and lubrication system 114 provides lubricant to components of fixed gearbox assembly 102. Lubrication system 112 includes tank 116, pump 118, heat exchanger 120, filter 122, lubrication lines 124, 126, 128, 130, 132 and sensors 134, 136, 138, 140, 142. Lubrication system 114 includes lubricant tank 146, pump 148, heat exchanger 150, filter 152, lubrication lines 154, 156, 158, 160, 162, 164, 166 and sensors 168, 170, 172, 174, 176, 178. Replacing the need for emergency lubrication system 180 discussed with reference to FIG. 4, lubrication arrangement 200 instead utilizes an emergency lubrication system 202 configured to autonomously supply a portion of the first lubricant from lubrication system 112 to emergency jets (not shown) within gearbox assembly 102 responsive to a loss of pressure in lubrication system 114 and to autonomously supply a portion of the second lubricant from lubrication system 114 to emergency jets (not shown) within gearbox assembly 104 responsive to a loss of pressure in lubrication system 112. In the illustrated embodiment, emergency lubrication system 202 includes a valve assembly 204, a sensor 206 and an emergency lubrication line 208 that enable emergency lubrication system 202 to autonomously supply a portion of the first lubricant from lubrication system 112 to the emergency jets within gearbox assembly 102 responsive to a loss of pressure in lubrication system 114. Emergency lubrication system 202 also includes a valve assembly 210, a sensor 212 and an emergency lubrication line 214 that enable emergency lubrication system 202 to autonomously supply a portion of the second lubricant from lubrication system 114 to the emergency jets within gearbox assembly 104 responsive to a loss of pressure in lubrication system 112.

Valve assemblies 204, 210 represent mechanical devices that can be configured to regulate, direct or control the flow of lubricant within emergency lubrication system 202 by movement of a valve element between multiple positions such as open and closed positions or operating and emergency positions. Valve assemblies 204, 210 may be spring biased differential pressure operated valve assemblies that operate responsive to differential pressure between lubrication systems 112, 114 enabling autonomous emergency lubrication capabilities within lubrication arrangement 200 that provides persistent lubrication to components within gearbox assembly 102, in the event of a loss of lubrication relating to gearbox assembly 102 or persistent lubrication to components within gearbox assembly 104, in the event of a loss of lubrication relating to gearbox assembly 104. As used herein, the term "persistent" refers to a predetermined time period required to maintain manageable flight operations during a lubrication system failure or loss of lubrication event, such as for at least 30 minutes, after perception by the flight crew of the lubrication system failure or loss of lubrication event. In the illustrated embodiment, valve assemblies 204, 210 are positioned adjacent to respective gearbox assemblies 102, 104. In other embodiments, valve assemblies 204, 210 may be positioned within respective gearbox assemblies 102, 104 or intermediately between gearbox assemblies 102, 104. Sensors 206, 212 represent devices that are configured to detect one or more aircraft parameters such as pressure. Emergency lubrication lines 208, 214 represent rigid pipelines, such as core passages in the housing of a gearbox, or flexible hoses, such as fluoropolymer tubing. The type of lubrication lines used may depend on the location of the line or expected fluid pressure within the line. Lubrication lines 208, 214 may include other components such as swivels and quick disconnect couplings.

Importantly, lubrication arrangement 200 does not include an extra lubrication tank containing emergency lubricant, a dedicated pump or a dedicated heating system to maintain the emergency lubricant at a suitable temperature. Instead, tanks 116, 146 are designed and sized to include an amount of extra lubricant sufficient for persistent lubrication of gearbox assembly 102 and gearbox assembly 104, respectively, such as an extra three to four gallons of lubricant each. More specifically, upon determining the lubricant flow rate that is critical to sustain operation of gearbox assemblies 102, 104 during respective loss of lubrication events, lubrication arrangement 200 can be designed such that tanks 116, 146 are suitably sized to provide persistent flow rates and volumes such that sustained operation of the affected gearbox may be provided for a predetermined time period, such as 30 minutes.

Figure 6A:
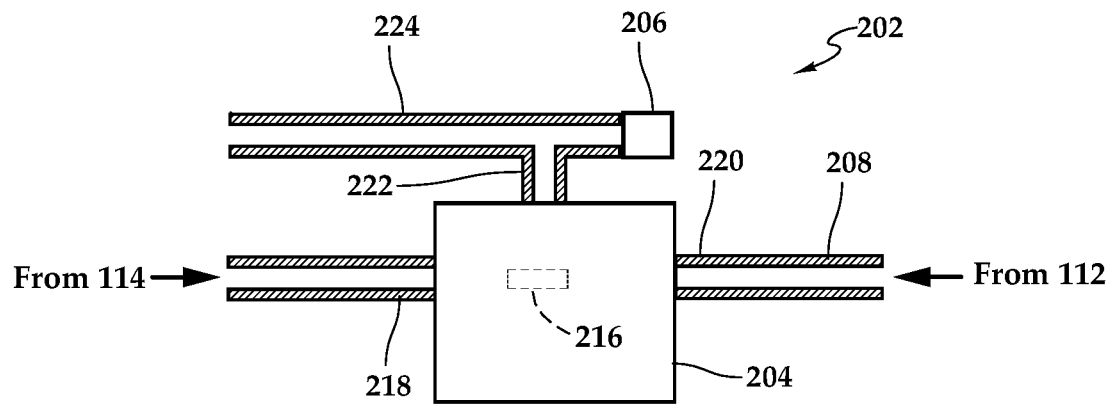
FIGS. 6A-6D are schematic illustrations of valve assemblies for use in an autonomous emergency lubrication system for a drive system of a tiltrotor aircraft in various operating modes in accordance with embodiments of the present disclosure.

As discussed herein, under normal operating conditions lubrication system 112 provides lubricant to components of rotatable gearbox assembly 104 and lubrication system 114 provides lubricant to components of fixed gearbox assembly 102. As such, under normal operating conditions, these two lubrication systems 112, 114 operate independent of one another. For example, during normal operating conditions of lubrication system 114, the pressure from lubrication system 114 maintains valve assembly 204 in the closed position, as best seen in FIG. 6A. In the illustrated embodiment, pressure from lubrication system 112 acts on the right side of a valve element 216 and pressure from lubrication system 114 acts on the left side of valve element 216. Preferably, valve element 216 is a differential pressure operated shuttle valve element that is spring biased toward the closed position to aid the pressure from lubrication system 114 in maintaining valve element 216 in the closed position during normal operating conditions of lubrication system 114. In one example, the pressure in each of lubrication systems 112, 114 is 80 psi. The 80 psi pressure from lubrication system 114 enters valve assembly 204 at inlet port 218, as indicated by the arrow from 114, and acts to bias valve element 216 toward the closed position. At the same, the 80 psi pressure from lubrication system 112 enters valve assembly 204 via emergency lubrication line 208 at inlet port 220, as indicated by the arrow from 112, and acts to bias valve element 216 toward the open position. In addition, the spring of valve element 216 has a spring rate equivalent to 30-50 psi, for example, that acts to bias valve element 216 toward the closed position. In this configuration, valve element 216 prevents lubricant from either of lubrication systems 112, 114 from entering discharge port 222 and sensor 206 reads zero psi or a nominal pressure in emergency lubrication line 224 that is in communication with the emergency jets of gearbox assembly 102.

Figure 6B:
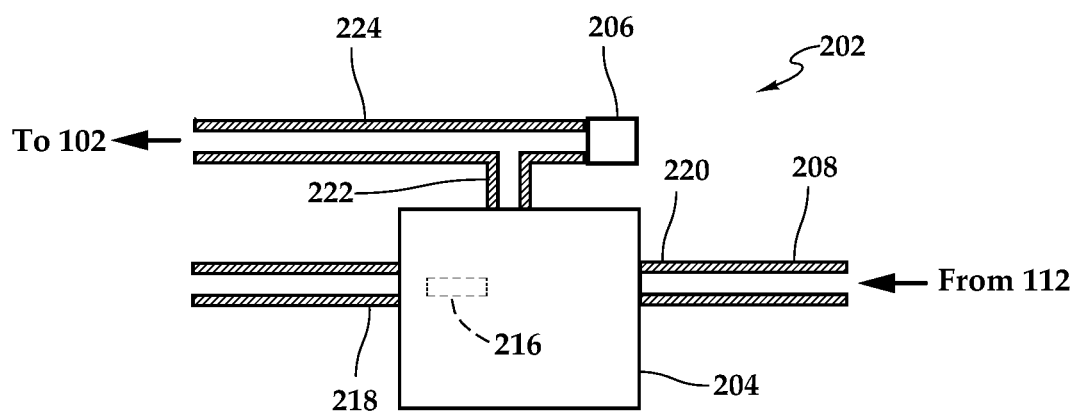

As best seen in FIG. 6B, responsive to a loss of pressure in lubrication system 114, as indicated by no arrow from 114 entering inlet port 218, the 80 psi pressure from lubrication system 112 entering valve assembly 204 at inlet port 220, as indicated by the arrow from 112, has overcome the spring force and shifted valve element 216 to the open position. In this configuration, valve assembly 204 provides fluid communication between inlet port 220 and discharge port 222 such that lubricant from lubrication system 112 travels through valve assembly 204 to emergency lubrication line 224 and thus to the emergency jets of gearbox assembly 102, as indicated by the arrow to 102. As the process for establishing the flow of emergency lubricant to gearbox assembly 102 when lubrication system 114 experiences a loss of pressure does not require the use of sensors, commands from flight control computer 30, pilot action or other intervention, emergency lubrication system 202 is considered to autonomously supply the emergency lubricant from lubrication system 112 to gearbox assembly 102 responsive to the loss of pressure in lubrication system 114. The magnitude of the loss of pressure required to trigger autonomous operation of emergency lubrication system 202 may be predetermined based upon the spring rate of the spring biasing valve element 216 toward the closed position. For example, if the normal operation pressure in each of lubrication systems 112, 114 is 80 psi and the spring biasing valve element 216 toward the closed position has a spring rate equivalent to 50 psi, then a loss of pressure below a 30 psi threshold pressure within lubrication system 114 would result in autonomous operation of emergency lubrication system 202.

Sensor 206 detects pressure in emergency lubrication line 224 such that operation of emergency lubrication system 202 can be detected and reported to flight control computer 30 and/or the flight crew. Valve assembly 204 and/or emergency lubrication line 224 may include one or more flow restrictors that reduce the 80 psi pressure from lubrication system 112 to a lower pressure, such as 20 psi, which may allow for a slower flow rate of lubricant to the emergency jets of gearbox assembly 102 than would normally be supplied, in order to conserve lubricant. This enables emergency lubrication system 202 to provide persistent lubrication to components in gearbox assembly 102 for a predetermined period of time, such as at least 30 minutes, without negatively impacting the lubrication of gearbox assembly 104 by lubrication system 112.

Figure 6C:
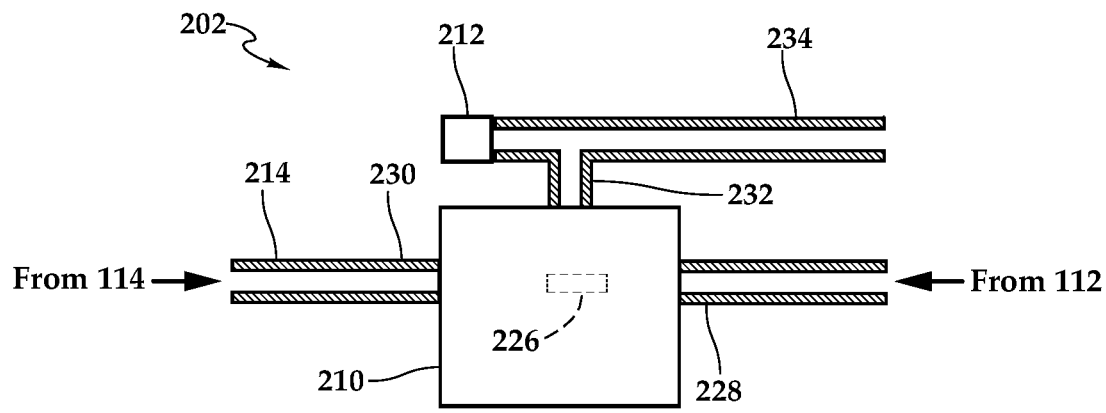

Referring now to FIG. 6C, during normal operating conditions of lubrication system 112, the pressure from lubrication system 112 maintains valve assembly 210 in the closed position. In the illustrated embodiment, pressure from lubrication system 112 acts on the right side of a valve element 226 and pressure from lubrication system 114 acts on the left side of valve element 226. Preferably, valve element 226 is a differential pressure operated shuttle valve element that is spring biased toward the closed position to aid the pressure from lubrication system 112 in maintaining valve element 226 in the closed position during normal operating conditions of lubrication system 112. Continuing with the example that the pressure in each of lubrication systems 112, 114 is 80 psi, the 80 psi pressure from lubrication system 112 enters valve assembly 210 at inlet port 228, as indicated by the arrow from 112, and acts to bias valve element 226 toward the closed position. At the same, the 80 psi pressure from lubrication system 114 enters valve assembly 210 via emergency lubrication line 214 at inlet port 230, as indicated by the arrow from 114, and acts to bias valve element 226 toward the open position. In addition, the spring of valve element 226 has a spring rate equivalent to 30-50 psi, for example, that acts to bias valve element 226 toward the closed position. In this configuration, valve element 226 prevents lubricant from either of lubrication systems 112, 114 from entering discharge port 232 and sensor 212 reads zero psi or a nominal pressure in emergency lubrication line 234 that is in communication with the emergency jets of gearbox assembly 104.

Figure 6D:
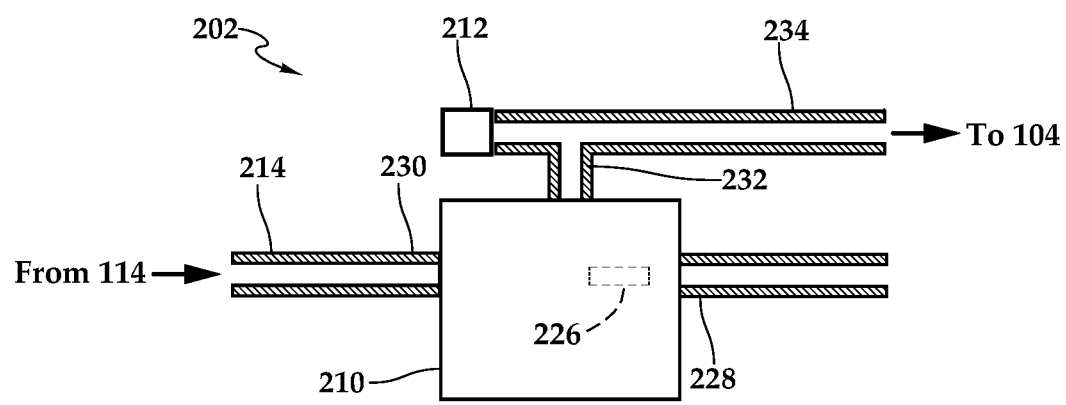

As best seen in FIG. 6D, responsive to a loss of pressure in lubrication system 112, as indicated by no arrow from 112 entering inlet port 228, the 80 psi pressure from lubrication system 114 entering valve assembly 210 at inlet port 230, as indicated by the arrow from 114, has overcome the spring force and shifted valve element 226 to the open position. In this configuration, valve assembly 210 provides fluid communication between inlet port 230 and discharge port 232 such that lubricant from lubrication system 114 travels through valve assembly 210 to emergency lubrication line 234 and thus to the emergency jets of gearbox assembly 104, as indicated by the arrow to 104. As the process for establishing the flow of emergency lubricant to gearbox assembly 104 when lubrication system 112 experiences a loss of pressure does not require the use of sensors, commands from flight control computer 30, pilot action or other intervention, emergency lubrication system 202 is considered to autonomously supply the emergency lubricant from lubrication system 114 to gearbox assembly 104 responsive to the loss of pressure in lubrication system 112. The magnitude of the loss of pressure required to trigger autonomous operation of emergency lubrication system 202 may be predetermined based upon the spring rate of the spring biasing valve element 226 toward the closed position, as discussed herein.

Sensor 212 detects pressure in emergency lubrication line 234 such that operation of emergency lubrication system 202 can be detected and reported to flight control computer 30 and/or the flight crew. Valve assembly 210 or emergency lubrication line 234 may include one or more flow restrictors that reduce the 80 psi pressure from lubrication system 114 to a lower pressure, such as 20 psi, which may allow for a slower flow rate of lubricant to the emergency jets of gearbox assembly 104 than would normally be supplied, in order to conserve lubricant. This enables emergency lubrication system 202 to provide persistent lubrication to components in gearbox assembly 104 for a predetermined period of time, such as at least 30 minutes, without negatively impacting the lubrication of gearbox assembly 102 by lubrication system 114.

Figure 7A:
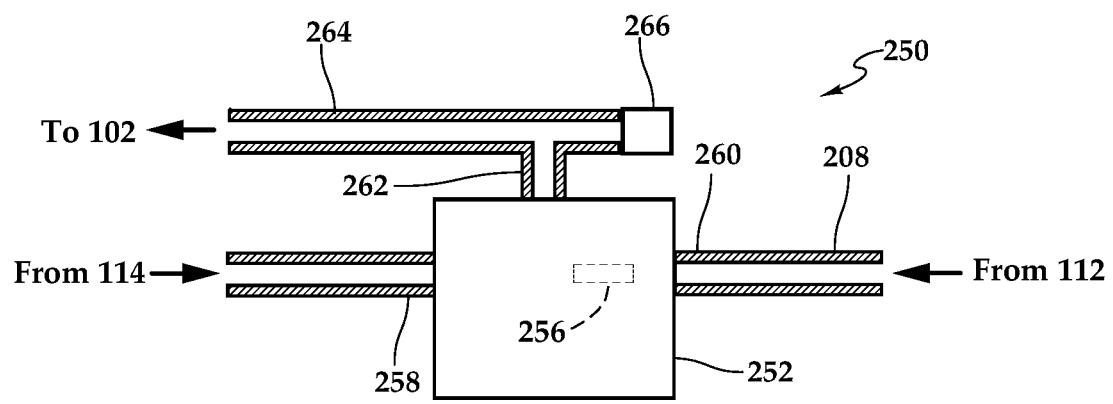
FIGS. 7A-7D are schematic illustrations of valve assemblies for use in an autonomous emergency lubrication system for a drive system of a tiltrotor aircraft in various operating modes in accordance with embodiments of the present disclosure.

Referring now to FIGS. 7A-7D of the drawings, an embodiment of an autonomous emergency lubrication system is generally designated 250. In emergency lubrication system 250, valve assemblies 252, 254 replace valve assemblies 204, 210 of emergency lubrication system 202. During normal operating conditions of lubrication system 114, the pressure from lubrication system 114 maintains valve assembly 252 in an operating position, as best seen in FIG. 7A. In the illustrated embodiment, pressure from lubrication system 112 acts on the right side of a valve element 256 and pressure from lubrication system 114 acts on the left side of valve element 256. Preferably, valve element 256 is a differential pressure operated shuttle valve element that is spring biased toward the operating position to aid the pressure from lubrication system 114 in maintaining valve element 256 in the operating position during normal operating conditions of lubrication system 114. In one example, the pressure in each of lubrication systems 112, 114 is 80 psi. The 80 psi pressure from lubrication system 114 enters valve assembly 252 at inlet port 258, as indicated by the arrow from 114, and acts to bias valve element 256 toward the operating position. At the same, the 80 psi pressure from lubrication system 112 enters valve assembly 252 via emergency lubrication line 208 at inlet port 260, as indicated by the arrow from 112, and acts to bias valve element 256 toward an emergency position. In addition, the spring of valve element 256 has a spring rate equivalent to 30-50 psi, for example, that acts to bias valve element 256 toward the operating position. In this configuration, valve assembly 252 provides fluid communication between inlet port 258 and discharge port 262 such that lubricant from lubrication system 114 travels through valve assembly 252 to lubrication line 264 and thus to certain lubrication jets of gearbox assembly 102, as indicated by the arrow to 102. A sensor 266 may be used to detect the pressure in lubrication line 264.

Figure 7B:
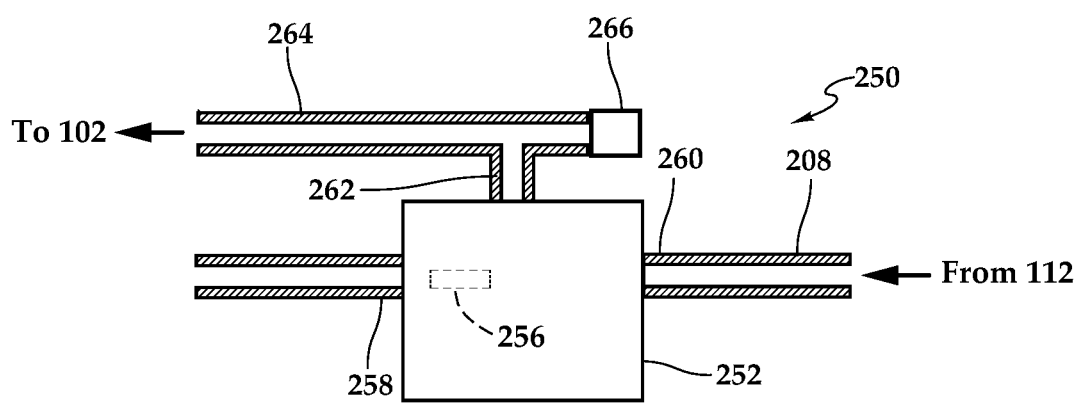

As best seen in FIG. 7B, responsive to a loss of pressure in lubrication system 114, as indicated by no arrow from 114 entering inlet port 258, the 80 psi pressure from lubrication system 112 entering valve assembly 252 at inlet port 260, as indicated by the arrow from 112, has overcome the spring force and shifted valve element 256 to the emergency position. In this configuration, valve assembly 252 provides fluid communication between inlet port 260 and discharge port 262 such that lubricant from lubrication system 112 travels through valve assembly 252 to lubrication line 264 and thus to certain lubrication jets of gearbox assembly 102 now acting as emergency jets, as indicated by the arrow to 102. As the process for establishing the flow of emergency lubricant to gearbox assembly 102 when lubrication system 114 experiences a loss of pressure does not require the use of sensors, commands from flight control computer 30, pilot action or other intervention, emergency lubrication system 250 is considered to autonomously supply the emergency lubricant from lubrication system 112 to gearbox assembly 102 responsive to the loss of pressure in lubrication system 114. The magnitude of the loss of pressure required to trigger autonomous operation of emergency lubrication system 250 may be predetermined based upon the spring rate of the spring biasing valve element 256 toward the operating position, as discussed herein. In this manner, emergency lubrication system 250 provides persistent lubrication to components in gearbox assembly 102 for a predetermined period of time, such as at least 30 minutes, without negatively impacting the lubrication of gearbox assembly 104 by lubrication system 112.

Figure 7C:
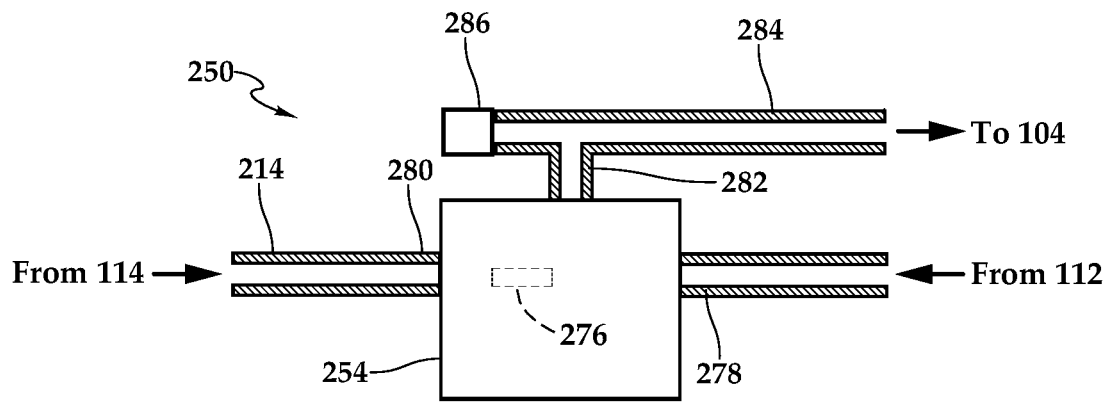

Referring now to FIG. 7C, during normal operating conditions of lubrication system 112, the pressure from lubrication system 112 maintains valve assembly 254 in the operating position. In the illustrated embodiment, pressure from lubrication system 112 acts on the right side of a valve element 276 and pressure from lubrication system 114 acts on the left side of valve element 276. Preferably, valve element 276 is a differential pressure operated shuttle valve element that is spring biased toward the operating position to aid the pressure from lubrication system 112 in maintaining valve element 276 in the operating position during normal operating conditions of lubrication system 112. Continuing with the example that the pressure in each of lubrication systems 112, 114 is 80 psi, the 80 psi pressure from lubrication system 112 enters valve assembly 254 at inlet port 278, as indicated by the arrow from 112, and acts to bias valve element 276 toward the operating position. At the same, the 80 psi pressure from lubrication system 114 enters valve assembly 254 via emergency lubrication line 214 at inlet port 280, as indicated by the arrow from 114, and acts to bias valve element 276 toward the emergency position. In addition, the spring of valve element 276 has a spring rate equivalent to 30-50 psi, for example, that acts to bias valve element 276 toward the operating position. In this configuration, valve assembly 254 provides fluid communication between inlet port 278 and discharge port 282 such that lubricant from lubrication system 112 travels through valve assembly 254 to lubrication line 284 and thus to certain lubrication jets of gearbox assembly 104, as indicated by the arrow to 104. A sensor 286 may be used to detect the pressure in lubrication line 284.

Figure 7D:
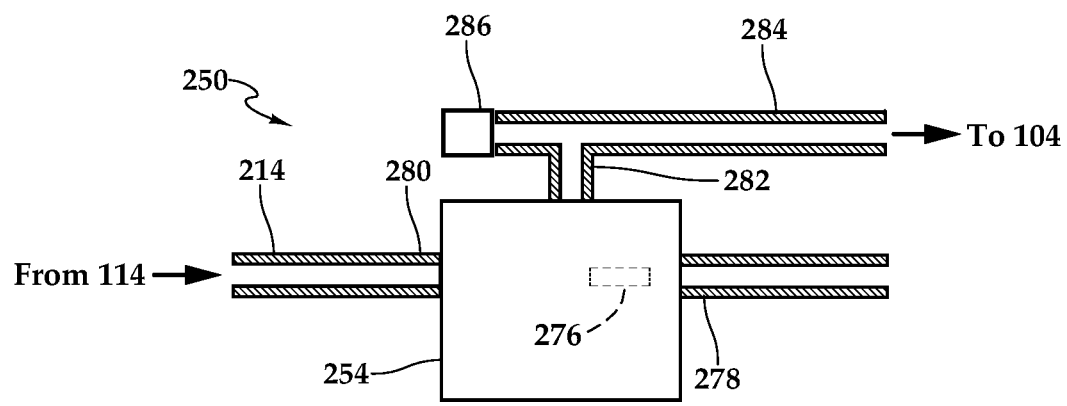

As best seen in FIG. 7D, responsive to a loss of pressure in lubrication system 112, as indicated by no arrow from 112 entering inlet port 278, the 80 psi pressure from lubrication system 114 entering valve assembly 254 at inlet port 280, as indicated by the arrow from 114, has overcome the spring force and shifted valve element 276 to the emergency position. In this configuration, valve assembly 254 provides fluid communication between inlet port 280 and discharge port 282 such that lubricant from lubrication system 114 travels through valve assembly 254 to lubrication line 284 and thus to certain lubrication jets of gearbox assembly 104 now acting as emergency jets, as indicated by the arrow to 104. As the process for establishing the flow of emergency lubricant to gearbox assembly 104 when lubrication system 112 experiences a loss of pressure does not require the use of sensors, commands from flight control computer 30, pilot action or other intervention, emergency lubrication system 250 is considered to autonomously supply the emergency lubricant from lubrication system 114 to gearbox assembly 104 responsive to the loss of pressure in lubrication system 112. The magnitude of the loss of pressure required to trigger autonomous operation of emergency lubrication system 250 may be predetermined based upon the spring rate of the spring biasing valve element 276 toward the operating position, as discussed herein. In this manner, emergency lubrication system 250 provides persistent lubrication to components in gearbox assembly 104 for a predetermined period of time, such as at least 30 minutes, without negatively impacting the lubrication of gearbox assembly 102 by lubrication system 114.

The present embodiments, provide an improved emergency lubrication system that has persistent lubrication for multiple aircraft gearbox assemblies following a failure or loss of lubrication in any one of the aircraft gearbox assemblies. The improved emergency lubrication system disclosed in the present embodiments utilizes a differential pressure operated valving system that simplifies prior emergency lubrication systems by removing the need for intervention by a flight control computer or a flight crew member to commence emergency lubrication activities. In addition, the improved emergency lubrication system disclosed in the present embodiments provides significant weight savings compared to prior emergency lubrication systems. Further, the improved emergency lubrication system disclosed in the present embodiments reduces the potential leak paths compared to prior emergency lubrication systems by reducing the complexity and number of the components, the lubrications lines and the connections therebetween.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. For example, numerous combinations of the features disclosed herein will be apparent to persons skilled in the art including the combining of features described in different and diverse embodiments, implementations, contexts, applications and/or figures. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A drive system for an aircraft, the drive system comprising:
   a first gearbox assembly;
   a second gearbox assembly in mechanical communication with the first gearbox assembly;
   a first pressurized lubrication system configured to circulate a first lubricant through the first gearbox assembly;
   a second pressurized lubrication system configured to circulate a second lubricant through the second gearbox assembly; and
   an emergency lubrication system including a passive valve assembly positioned between the first pressurized lubrication system and the second pressurized lubrication system, the emergency lubrication system configured to autonomously supply a portion of the first lubricant to the second gearbox assembly responsive to a change in differential pressure between the first pressurized lubrication system and the second pressurized lubrication system;

wherein, the passive valve assembly includes a valve element having a first side subjected to a biasing pressure from the first pressurized lubrication system and a second side subjected to a biasing pressure from the second pressurized lubrication system, the valve element moveable between a plurality of positions in response to a change in the biasing pressure from at least one of the first pressurized lubrication system or the second pressurized lubrication system;

wherein, pressure in the second pressurized lubrication system maintains the passive valve assembly in a closed position during normal operating conditions of the second pressurized lubrication system such that the first lubricant does not pass through the passive valve assembly; and wherein, responsive to a loss of pressure in the second pressurized lubrication system, the passive valve assembly shifts to an open position such that the portion of the first lubricant is autonomously supplied to the second gearbox assembly.

2. The drive system as recited in claim 1, wherein the first gearbox assembly further comprises one of a proprotor gearbox and an interconnect gearbox; and wherein, the second gearbox assembly further comprises the other of the proprotor gearbox and the interconnect gearbox.

3. The drive system as recited in claim 1, wherein each of the first and second pressurized lubrication systems further comprises a tank, a pump, a heat exchanger, and a filter interconnected by lubrication lines.

4. The drive system as recited in claim 1, wherein the first pressurized lubrication system is independent of the second pressurized lubrication system during normal operating conditions.

5. The drive system as recited in claim 1, wherein the passive valve assembly further comprises a differential pressure operated valve assembly.

6. The drive system as recited in claim 1, wherein the emergency lubrication system is configured to autonomously supply the portion of the first lubricant to the second gearbox assembly for a predetermined period of time responsive to the change in differential pressure between the first pressurized lubrication system and the second pressurized lubrication system.

7. The drive system as recited in claim 1, wherein the change in differential pressure between the first pressurized lubrication system and the second pressurized lubrication system further comprises the pressure in the second pressurized lubrication system falling below a predetermined threshold pressure.

8. The drive system as recited in claim 1, wherein the emergency lubrication system further comprises a sensor configured to detect when the portion of the first lubricant is autonomously supplied to the second gearbox assembly.

9. The drive system as recited in claim 1, wherein the emergency lubrication system is configured to autonomously supply a portion of the second lubricant to the first gearbox assembly responsive to a change in differential pressure between the second pressurized lubrication system and the first pressurized lubrication system.

10. The drive system as recited in claim 9, wherein the emergency lubrication system further comprises a second passive valve assembly positioned between the first pressurized lubrication system and the second pressurized lubrication system.

11. The drive system as recited in claim 10, wherein pressure in the first pressurized lubrication system maintains the second passive valve assembly in a closed position during normal operating conditions of the first pressurized lubrication system; and wherein, responsive to a loss of pressure in the first pressurized lubrication system, the second passive valve assembly shifts to an open position such that the portion of the second lubricant is autonomously supplied to the first gearbox assembly.

12. The drive system as recited in claim 9, wherein the emergency lubrication system is configured to autonomously supply the portion of the second lubricant to the first gearbox assembly for a predetermined period of time responsive to the change in differential pressure between the second pressurized lubrication system and the first pressurized lubrication system.

13. The drive system as recited in claim 9, wherein the change in differential pressure between the second pressurized lubrication system and the first pressurized lubrication system further comprises the pressure in the first pressurized lubrication system falling below a predetermined threshold pressure.

14. The drive system as recited in claim 10, wherein the second passive valve assembly is maintained in an operating configuration to supply a portion of the first lubricant to the first gearbox assembly during normal operating conditions of the first pressurized lubrication system; and wherein, responsive to a loss of pressure in the first pressurized lubrication system, the second passive valve assembly shifts to an emergency position such that the portion of the second lubricant is autonomously supplied to the first gearbox assembly.

15. The drive system as recited in claim 10, wherein the second passive valve assembly further comprises a differential pressure operated valve assembly.

16. The drive system as recited in claim 1, wherein the passive valve assembly is responsive to the change in differential pressure between the first pressurized lubrication system and the second pressurized lubrication system independent of external input from a computer.

17. A tiltrotor aircraft having a helicopter mode and an airplane mode, the tiltrotor aircraft comprising:

a proprotor assembly;

a first gearbox assembly in mechanical communication with the proprotor assembly;

a second gearbox assembly in mechanical communication with the first gearbox assembly;

an engine in mechanical communication with the second gearbox assembly and configured to provide torque and rotational energy to the proprotor assembly via the first and second gearbox assemblies;

a first pressurized lubrication system configured to circulate a first lubricant through the first gearbox assembly;

a second pressurized lubrication system configured to circulate a second lubricant through the second gearbox assembly; and an emergency lubrication system including first and second passive valve assemblies positioned between the first pressurized lubrication system and the second pressurized lubrication system, the emergency lubrication system configured to autonomously supply a portion of the first lubricant to the second gearbox assembly responsive to a change in differential pressure between the first pressurized lubrication system and the second pressurized lubrication system and configured to autonomously supply a portion of the second lubricant to the first gearbox assembly responsive to a change in differential pressure between the second pressurized lubrication system and the first pressurized lubrication system;

wherein, the first and second passive valve assemblies each include a valve element having a first side subjected to a biasing pressure from the first pressurized lubrication system and a second side subjected to a biasing pressure from the second pressurized lubrication system, each valve element moveable between a plurality of positions in response to a change in the biasing pressure from at least one of the first pressurized lubrication system or the second pressurized lubrication system;

wherein, pressure in the second pressurized lubrication system maintains the first passive valve assembly in a closed position during normal operating conditions of the second pressurized lubrication system such that the first lubricant does not pass through the first passive valve assembly; and wherein, responsive to a loss of pressure in the second pressurized lubrication system, the first passive valve assembly shifts to an open position such that the portion of the first lubricant is autonomously supplied to the second gearbox assembly.

18. An aircraft comprising:
a rotor assembly;
a first gearbox assembly in mechanical communication with the rotor assembly;
a second gearbox assembly in mechanical communication with the first gearbox assembly;
an engine in mechanical communication with the second gearbox assembly and configured to provide torque and rotational energy to the rotor assembly via the first and second gearbox assemblies;
a first pressurized lubrication system configured to circulate a first lubricant through the first gearbox assembly;
a second pressurized lubrication system configured to circulate a second lubricant through the second gearbox assembly; and
an emergency lubrication system including first and second passive valve assemblies positioned between the first pressurized lubrication system and the second pressurized lubrication system, the emergency lubrication system configured to autonomously supply a portion of the first lubricant to the second gearbox assembly responsive to a change in differential pressure between the first pressurized lubrication system and the second pressurized lubrication system and configured to autonomously supply a portion of the second lubricant to the first gearbox assembly responsive to a change in differential pressure between the second pressurized lubrication system and the first pressurized lubrication system;

wherein, the first and second passive valve assemblies each include a valve element having a first side subjected to a biasing pressure from the first pressurized lubrication system and a second side subjected to a biasing pressure from the second pressurized lubrication system, each valve element moveable between a plurality of positions in response to a change in the biasing pressure from at least one of the first pressurized lubrication system or the second pressurized lubrication system;

wherein, pressure in the second pressurized lubrication system maintains the first passive valve assembly in a closed position during normal operating conditions of the second pressurized lubrication system such that the first lubricant does not pass through the first passive valve assembly; and wherein, responsive to a loss of pressure in the second pressurized lubrication system, the first passive valve assembly shifts to an open position such that the portion of the first lubricant is autonomously supplied to the second gearbox assembly.

* * * * *